United States Patent
Moon

(10) Patent No.: US 7,315,411 B2
(45) Date of Patent: Jan. 1, 2008

(54) OPTICAL SHUTTER FOR PLASMA DISPLAY PANEL AND DRIVING METHOD THEREOF

(75) Inventor: Won Seok Moon, Seoul (KR)

(73) Assignee: LG Electronics Inc., Seoul (KR)

( * ) Notice: Subject to any disclaimer, the term of this patent is extended or adjusted under 35 U.S.C. 154(b) by 207 days.

(21) Appl. No.: 11/007,176

(22) Filed: Dec. 9, 2004

(65) Prior Publication Data
US 2005/0128370 A1    Jun. 16, 2005

(30) Foreign Application Priority Data
Dec. 10, 2003  (KR)  .................. 10-2003-0089830

(51) Int. Cl.
*G02B 26/02* (2006.01)
(52) U.S. Cl. .................................... 359/227
(58) Field of Classification Search ............. 359/227; 156/67, 230; 349/32
See application file for complete search history.

(56) References Cited

U.S. PATENT DOCUMENTS 6,075,319 A * 6/2000 Kanda et al. ............... 313/584
6,800,166 B2 * 10/2004 Kosaka et al. .............. 156/230

* cited by examiner

Primary Examiner—Euncha P. Cherry
(74) Attorney, Agent, or Firm—Ked & Associates, LLP

(57) ABSTRACT

Disclosed herein are an optical shutter for a plasma display panel and driving method thereof. According to the present invention, an optical shutter, which employs a black organic solution that moves according to the electrowetting phenomenon and a pair of electrodes for providing voltages, is disposed on a display surface of the plasma display panel. In this state, during the non-display period, voltages are not applied to the optical shutter so that light emitted from the panel cannot transmit the optical shutter. During the display period, voltages having a different polarity are applied to the electrodes of the optical shutter so that light emitted from the panel can transmit the optical shutter. It is thus possible to completely prevent weak emission generating during the non-display period where cells are initialized and selected. Accordingly, there are effects in that contrast can be improved and the picture quality can be thus enhanced.

10 Claims, 3 Drawing Sheets

OPTICAL SHUTTER FOR PLASMA DISPLAY PANEL AND DRIVING METHOD THEREOF

CROSS-REFERENCES TO RELATED APPLICATIONS

This Nonprovisional application claims priority under 35 U.S.C. § 119(a) on Patent Application No. 10-2003-0089830 filed in Korea on Dec. 10, 2003, the entire contents of which are hereby incorporated by reference.

BACKGROUND OF THE INVENTION

1. Field of the Invention

The present invention relates to an optical shutter for a plasma display panel and driving method thereof. More particularly, the present invention relates to an optical shutter for a plasma display panel in which the optical shutter that can be selectively driven according to the electrowetting phenomenon is formed on a light-emitting unit of the plasma display panel, and the optical shutter is opened only during a display period, whereby contrast is improved, and a driving method thereof.

2. Background of the Related Art

Recently, the size of a plasma display panel (hereinafter, referred to as 'PDP') being a large-screen digital wall mount type television has increased from 30 to 76 inches. PDP manufacturers are in keen competition with one another in order to realize the low price.

A PDP device, which has been spotlighted as a next-generation display device along with a TFT LCD, organic EL, FED and the like, is a display device that employs a light-emitting phenomenon generating due to a difference in energy when red (R), green (G) and blue (B) phosphors return from an excited state to a ground state if the phosphors are excited with ultraviolet of 147 nm generated during the discharge of a gas such as He+Xe or Ne+Xe within discharge cells isolated by barrier ribs.

This PDP can have a variety of structures depending on its implementation method. However, most of the PDPs have a similar structure in which an electrode bus for driving each cell is disposed and a phosphor layer to be light-emitted by each cell is coated in cell regions isolated by barrier ribs.

FIG. 1 is a perspective view illustrating the construction of a common AC type PDP device.

A lower plate of the PDP includes address electrodes 2 of discharge cells, which are formed on the top surface of a lower glass substrate 1, a lower dielectric layer 3 formed on the entire address electrodes 2, barrier ribs 4, which are formed on the dielectric layer 3 and isolate the discharge cells, and phosphor layers 5 that are formed on the dielectric layer 3 and isolated by the barrier ribs 4. The dielectric layer 3 or the barrier ribs 4 can include some reflection materials for reflecting a visible ray generated by the phosphor layers 5. A shield film for preventing infiltration of alkali ion contained in the glass substrate 1 can be formed on the lower glass substrate 1.

Furthermore, an upper plate of the plasma display panel includes transparent electrodes 12 formed on the bottom surface of an upper glass substrate 11, bus electrodes 13 that lower resistance values of the transparent electrodes 12, a dielectric layer 14 formed on the entire top surface of the upper glass substrate 11, including the transparent electrodes 12 and the bus electrodes 13, and a protection layer 15 which is formed on the entire surface of the dielectric layer 14 and protects the dielectric layer 14 depending on plasma discharging. The upper plate formed thus is disposed so that the protection layer 15 faces the barrier ribs 4 and the phosphor layer 5 of the lower plate.

In the construction of the upper plate of the conventional plasma display panel, electrodes composed of a pair of the transparent electrode 12 and the bus electrode 13 operate as a scan electrode and a sustain electrode, and generate a discharge due to a difference in voltage provided thereto. In this time, the phosphor layer 5 within the discharge cell is excited by ultraviolet generated, thus generating a visible ray. In this case, the plasma display panel implements the gray scale necessary for displaying an image by controlling a discharge sustaining period depending on video data, i.e., the number of a sustain discharge.

A method of driving such a plasma display panel usually employs an ADS (Address and Display Separation) driving method in which the device is driven with it being divided into a screen non-display period and a screen display period, i.e., a discharge sustaining period. In the ADS driving method, one frame is divided into the n number of bits, and each of sub-fields is divided into a reset period, an address period and a sustain period.

In this time, the reset period is a period where an initial condition is set so that next addressing is possible. In this period, wall charges are allowed to have a constant state right before the address period in order for each cell to operate stably with uniform brightness.

The address period is a period where cell to be turned on and cells to be turned off are selected according to a data pulse. The sustain period is a period where a discharge for cells which are turned on in the address period is maintained.

The screen is not displayed during the reset period and the address period. In this connection, this can be called a 'non-display period'. Furthermore, the screen is displayed during the sustain period. Thus, this can be called a 'display period'.

Accordingly, the period where the screen is actually displayed is a discharge sustain period, i.e., a screen display period. It will be an ideal one that during the reset and address periods where cells to be discharged are selected before the sustain period, emission due to the discharge is not generated. However, actually, since cells of the whole panel region are initialized during the reset and address periods, a weak discharge is generated. This causes the black brightness of the panel to increase. Accordingly, the contrast characteristic of an image is degraded and the clearness is thus lowered.

As stated previously, the conventional plasma display panel employs the driving method in which the device is driven with it being divided into the non-display period where cells to be discharged are initialized and selected and the display period where a discharge is sustained and the screen is thus displayed. This makes contrast degraded because the weak discharge is generated in the non-display period where the screen is not displayed actually. Accordingly, there are problems in that the clearness decreases and the display quality is degraded accordingly.

SUMMARY OF THE INVENTION

Accordingly, the present invention has been made in view of the above problems, and it is an object of the present invention to provide an optical shutter for a plasma display panel in which the optical shutter, which employs a black organic solution that moves according to the electrowetting phenomenon, is formed on a display surface of the plasma display panel, wherein during the non-display period, voltages are not applied to the optical shutter so that light emitted from the panel does not transmit the optical shutter, and during the display period, voltages having a different polarity are applied to electrodes of the optical shutter so that light emitted from the panel can transmit the optical shutter, whereby a reduction in the contrast characteristic due to a weak discharge is prevented, and a driving method thereof.

To achieve the above object, according to the present invention, there is provided an optical shutter for a plasma display panel, including: a first transparent substrate, which includes a first electrode pattern and a dielectric layer having a hydrophobic property surface, barrier ribs formed on the dielectric layer for separating operating regions, a black organic solution and an aqueous solution both of which fill spaces between the barrier ribs, and a second transparent substrate, which is formed on the barrier ribs and has a second electrode pattern.

In the optical shutter for the plasma display panel according to the present invention, the dielectric layer is formed using polyimide or parylene and is below 10 μm in thickness, wherein fluorine based polymer of below 0.1 μm is coated on the dielectric layer so as to form the hydrophobic property surface.

In the optical shutter for the plasma display panel according to the present invention, the aqueous solution is a solution in which distilled water or electrolyte is dissolved, and if the aqueous solution in which the electrolyte is dissolved is used, the concentration of the electrolyte is below 0.3 mol/liter.

In the optical shutter for the plasma display panel according to the present invention, the organic solution is a solution in which a black non-polarity dye is dissolved using alkane of 10 to 16 in the carbon number as a solvent.

In the optical shutter for the plasma display panel according to the present invention, the first electrode pattern and the second electrode pattern are symmetric to each other, and if voltages are applied to the first electrode pattern and the second electrode pattern, portions in which a black organic solution is concentrated are portions in which the respective electrodes are patterned and removed.

In the optical shutter for the plasma display panel according to the present invention, portions in which electrodes of the first electrode pattern and the second electrode pattern are removed are coincident with the location of the black matrix formed in an upper plate of a plasma display panel.

In the optical shutter for the plasma display panel according to the present invention, the first transparent substrate the second transparent substrate are a glass composition or a film (PET, PE, etc.).

According to the present invention, there is provided a method of driving an optical shutter for a plasma display panel, including the steps of: during a non-display period where cells are initialized and selected for driving the panel, allowing an organic solution to block light emitted from the panel, and during a display period where the cells selected during the non-display period are light-emitted, applying voltages having a different polarity to electrodes of the optical shutter, whereby light emitted from the panel transmits portions of the optical shutter from which the organic solution is removed.

In the method for driving the optical shutter for the plasma display panel according to the present invention, the voltages for driving the optical shutter are at least 80V, preferably over 100V.

As described above, the optical shutter, which employs the black organic solution that moves according to the electrowetting phenomenon and has the pair of the electrodes for supplying voltages, is formed on the display surface of the plasma display panel. In this state, during the non-display period, voltages are not applied to the optical shutter so that light emitted from the panel does not transmit the optical shutter. Furthermore, during the display period, voltages having a different polarity are applied to the electrodes of the optical shutter so that light emitted from the panel can transmit the optical shutter. It is thus possible to completely prevent weak emission generating during the non-display period where cells are initialized and selected. Accordingly, the present invention is advantageous in that it can improve contrast and thus enhance the picture quality.

BRIEF DESCRIPTION OF THE DRAWINGS

Further objects and advantages of the invention can be more fully understood from the following detailed description taken in conjunction with the accompanying drawings in which.

DETAILED DESCRIPTION OF THE PREFERRED EMBODIMENT

Preferred embodiments of the present invention will be described in a more detailed manner with reference to the drawings.

Figure 2:
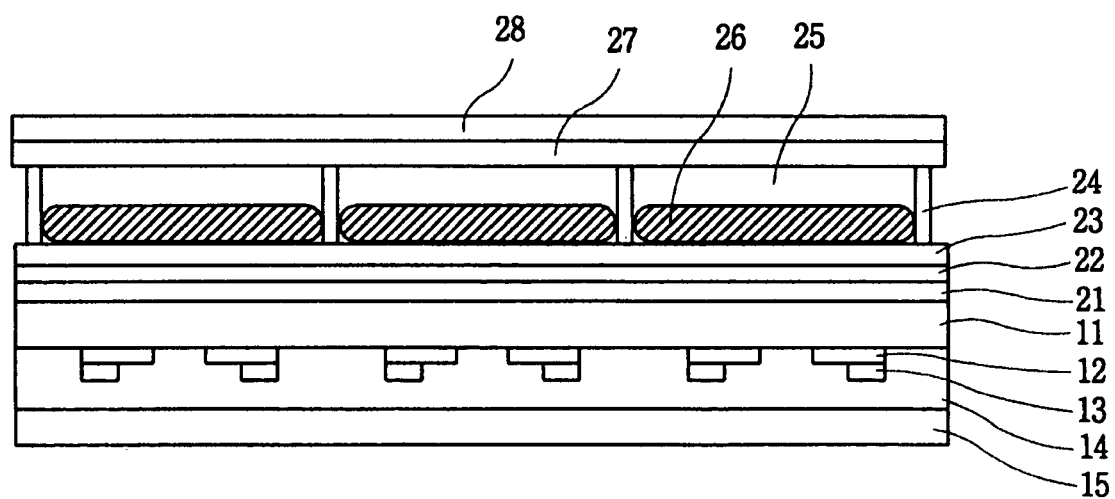
FIG. 2 is a plan view illustrating a plasma display panel to which an optical shutter according to an embodiment of the present invention is applied.

FIG. 2 is a plan view illustrating the plasma display panel to which the optical shutter according to an embodiment of the present invention is applied.

The construction of the optical shutter formed on an upper substrate 11 will be described with reference to FIG. 2. The optical shutter includes barrier ribs 24 for defining operating regions and physically supporting components, which are disposed between a first substrate 21 having a first electrode 22 and a dielectric layer 23 having a hydrophobic property surface, and a second substrate 28 having a second electrode 27. An aqueous solution 26 and an organic solution 25 are injected into the regions between the barrier ribs 24. The optical shutter is thus completed. The organic solution 25, which blocks the front display surface, is a material through which light cannot transmit. The organic solution has a black non-polarity dye dissolved in by using alkane of 10 to 16 in the carbon number as a solvent. Furthermore, the remaining portions in the regions are filled with a transparent aqueous solution 26 in which distilled water or electrolyte is dissolved.

Figure 1:
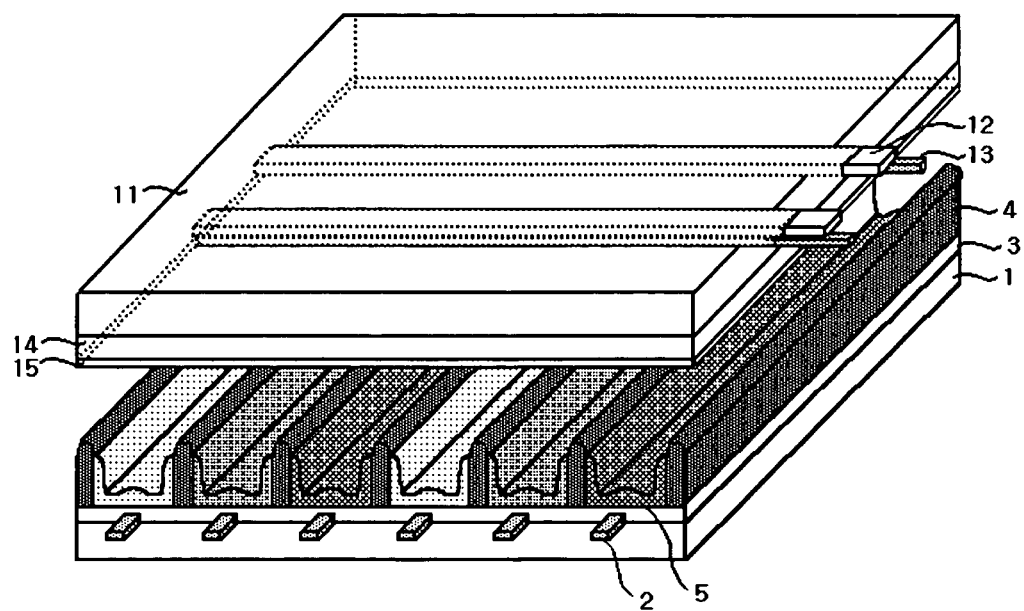
FIG. 1 is a perspective view illustrating the construction of a typical plasma display panel.

The organic solution 25 is heavier than the aqueous solution 26. Thus, in the case where the optical shutter does not operate, the organic solution 25 widely spreads on the dielectric layer 23 having the hydrophobic property surface, thereby blocking light from the plasma display panel. The barrier ribs 24 can be coincident with the barrier ribs 4 (see FIG. 1) of the plasma display panel so as to separate the operating regions of the optical shutter in a cell unit.

In the construction described above, if voltages of 80V or more (preferably, over 100V), which have a different polarity, are applied to the first electrode 22 and the second electrode 27, the contact characteristic between the dielectric layer 23 having the hydrophobic property surface and the organic solution 25 varies. Such variation in the contact characteristic between a solid having the hydrophobic property and a liquid, which is caused by these voltages, is called phenomenon.

The first electrode 22 and the second electrode 27 are patterned to form a region where the electrodes are removed. In this state, if voltages are applied, the organic solution 25 is concentrated in the region where the electrodes are not formed. The organic solution 25 is thus removed from the dielectric layer 23 having the hydrophobic property surface in the region where the electrodes are formed. Therefore, if voltages are applied, the optical shutter is opened, and light emitted from the plasma display panel can thus transmit the optical shutter.

For such optical transmission property, a material used for fabricating the optical shutter must be a transparent material, except for the organic solution 25 in which the black non-polarity dye is mixed.

The first substrate 21 and the second substrate 28 can be formed using a glass material or a transparent film (i.e., PET, PE, etc.). The first electrode 22 and the second electrode 27 can be formed using a material (i.e., ITO or ZnO) having a high transmissivity.

The dielectric layer 23 having the hydrophobic property surface can be formed using polyimide or parylene, and is below 10 μm in thickness. Fluorine based polymer of 0.1 μm is coated on the dielectric layer 23 in order to form the hydrophobic property surface.

As described above, the aqueous solution 26 is formed using the aqueous solution in which distilled water or electrolyte are dissolved. If the aqueous solution in which the electrolyte is dissolved is used, the concentration of the electrolyte has to be below 0.3 mol/liter.

Figure 3:
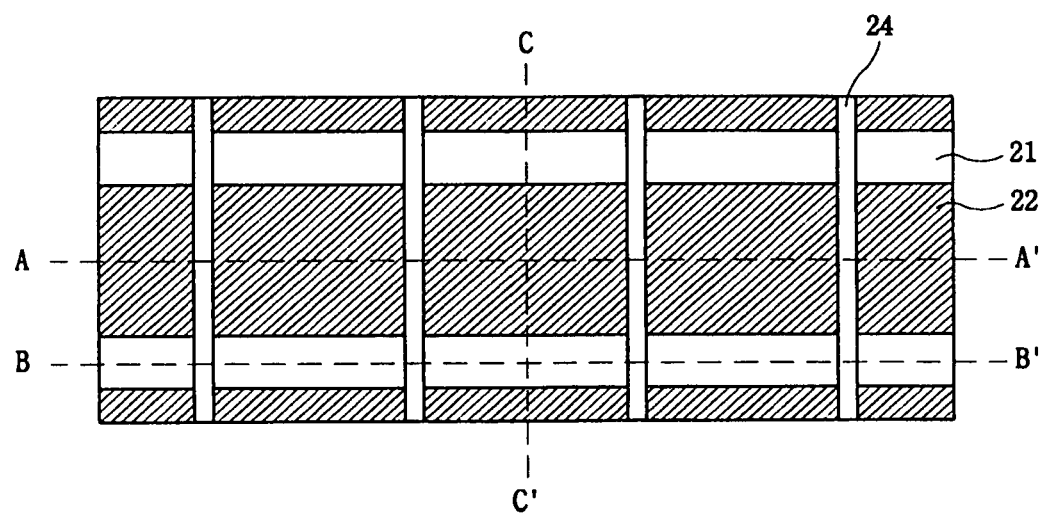
FIG. 3 is a plan view illustrating a first electrode pattern of the optical shutter according to an embodiment of the present invention.

FIG. 3 is a plan view illustrating the pattern of the first electrode 22, which defines the region in which the organic solution 25 pushed by the electrowetting phenomenon can be concentrated. In FIG. 3, it looks like that the electrodes are insulated since some of the electrodes are shown. It is, however, to be noted that all the electrodes are electrically connected at the boundary portions of the entire optical shutter and can be thus driven by a single electrode in a batch manner. Of course, the electrodes can be divided for individual driving. Thus, the present invention is not limited to a specific electrical circuit configuration.

As shown in FIG. 3, the transparent first electrode 22 is patterned to form the region in which the organic solution can be concentrated when the optical shutter operates. A portion, which was patterned and removed, is preferably coincident with the black matrix formed in the upper plate of the plasma display panel to which the optical shutter is applied. Therefore, a light-emitting region of an existing plasma display panel can be preserved by maximum because the portion where the organic solution is concentrated by the operation of the optical shutter does not block the light-emitting region.

After the dielectric layer 23 is formed in the first electrode 22, the organic solution 25 and the aqueous solution 26 are filled. The second substrate 28 having the second electrode 27 formed on is then disposed. In this state, if the pattern is viewed from line A-A', the cross section of the optical shutter shown in FIG. 2 is obtained. That is, if voltages are not applied to the electrodes, the organic solution 25 spreads on the entire regions as well as the first electrode 22 portion and the portion where the first electrode 22 is patterned, thus blocking light from transmitting the optical shutter.

Figure 4:
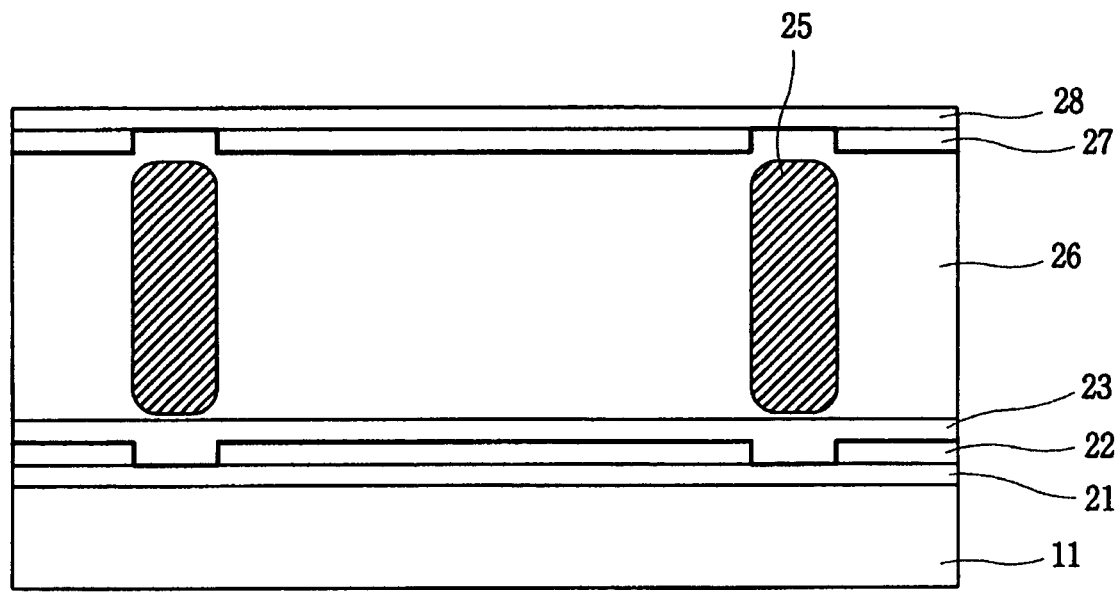
FIG. 4 is a cross-sectional view for explaining the operation of the optical shutter according to an embodiment of the present invention.
Figure 5:
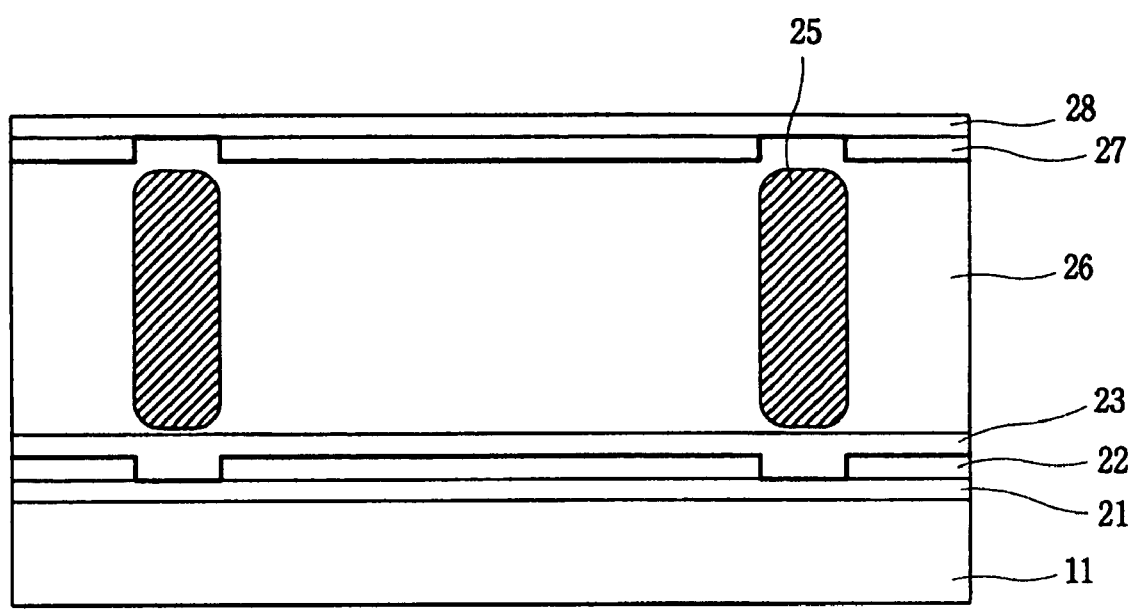
FIG. 5 is a cross-sectional view for explaining the operation of the optical shutter, which is vertical to the cross-sectional view of FIG. 4.

FIGS. 4 and 5 are views illustrating movements of the organic solution 25 when voltages are applied to the first electrode 22 and the second electrode 27. FIG. 4 is a cross-sectional view taken along line B-B' in FIG. 3, and FIG. 5 is a cross-sectional view taken along line C-C' in FIG. 3.

From FIG. 4, it can be seen that the organic solution 25 is concentrated over the dielectric layer 23 at the portions where the first electrode 22 and the second electrode 27 are removed. From FIG. 5 which is a cross-sectional view vertical to a corresponding direction, it can be seen that the organic solution 25 is concentrated at the portions where the first electrode 22 and the second electrode 27 are patterned and the organic solution 25 is all pushed out from the remaining portions (portions where the electrodes are formed). Therefore, while voltages are applied, light can transmit the optical shutter.

The region in which the electrodes are formed is coincident with the light-emitting region of the plasma display panel at which the optical shutter is located. Thus, light can be emitted without loss relatively.

Therefore, whether to display the screen of the plasma display panel can be decided by controlling the time when the voltages are applied to the first and second electrodes of the optical shutter. If the optical shutter keeps closed by not allowing the voltages to the optical shutter during the screen non-display period where cells to be displayed are initialized and selected, a weak emitting light can be blocked. Then, during the screen display period, the optical shutter keeps opened by applying the voltages to the optical shutter. Therefore, a display image can be outputted.

According to the driving method described above, the contrast of the screen can be improved significantly and the clearness of the screen can be significantly improved accordingly.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An optical shutter for increasing display quality of a plasma display panel, the optical shutter comprising:
   a first transparent substrate having a first electrode pattern and a dielectric layer;
   barrier ribs formed on the dielectric layer for separating operating regions;
   solutions that fill spaces between the barrier ribs; and
   a second transparent substrate, which is formed on the barrier ribs and has a second electrode pattern,
   wherein the first transparent substrate is formed on the plasma display panel which includes an upper plate and a lower plate.

2. The optical shutter according to claim 1, wherein the dielectric layer has a hydrophobic property surface.

3. The optical shutter according to claim 1, wherein the solutions include a black organic solution and an aqueous solution.

4. An optical shutter for increasing display quality of a plasma display panel, the optical shutter comprising:

a first transparent substrate, which includes a first electrode pattern and a dielectric layer having a hydrophobic property surface;

barrier ribs, which are formed on the dielectric layer and separate operating regions;

a black organic solution and an aqueous solution both of which fill spaces between the barrier ribs; and a second transparent substrate, which is formed on the barrier ribs and has a second electrode pattern, wherein the first transparent substrate is formed on the plasma display panel which includes an upper plate and a lower plate.

5. The optical shutter according to claim 4, wherein the dielectric layer is formed using polyimide or parylene and is below 10 μm in thickness, wherein fluorine based polymer of below 0.1 μm is coated on the dielectric layer so as to form the hydrophobic property surface.

6. The optical shutter according to claim 4, wherein the aqueous solution is a solution in which distilled water or electrolyte is dissolved, and if the aqueous solution in which the electrolyte is dissolved is used, the concentration of the electrolyte is below 0.3 mol/liter.

7. The optical shutter according to claim 4, wherein the organic solution is a solution in which a black non-polarity dye is dissolved using alkane of 10 to 16 in the carbon number as a solvent.

8. The optical shutter according to claim 4, wherein the first electrode pattern and the second electrode pattern are symmetric to each other, and if voltages are applied to the first electrode pattern and the second electrode pattern, portions in which a black organic solution is concentrated are portions in which the respective electrodes are patterned and removed.

9. The optical shutter according to claim 4, wherein portions in which electrodes of the first electrode pattern and the second electrode pattern are removed are coincident with the location of the black matrix formed in the upper plate of the plasma display panel.

10. The optical shutter according to claim 4, wherein the first transparent substrate and the second transparent substrate are a glass composition or a film (PET, PE, etc.).

* * * * *